(12) United States Patent
Ito et al.

(10) Patent No.: US 7,141,795 B2
(45) Date of Patent: Nov. 28, 2006

(54) RADIOACTIVITY MEASURING APPARATUS USING OPTICAL FIBER

(75) Inventors: Yasuhisa Ito, Naka-gun (JP); Hisashi Ishikawa, Naka-gun (JP); Toshio Miyake, Fussa (JP); Tetsuo Sawada, Fussa (JP)

(73) Assignee: Japan Nuclear Cycle Development Institute, Ibaraki-ken (JP)

( * ) Notice: Subject to any disclaimer, the term of this patent is extended or adjusted under 35 U.S.C. 154(b) by 66 days.

(21) Appl. No.: 11/058,220

(22) Filed: Feb. 16, 2005

(65) Prior Publication Data

US 2005/0189495 A1   Sep. 1, 2005

(30) Foreign Application Priority Data

Feb. 26, 2004   (JP) .............................. 2004-051837

(51) Int. Cl.
*G01T 1/20* (2006.01)
(52) U.S. Cl. ..................................... 250/368
(58) Field of Classification Search ................. 250/368
See application file for complete search history.

(56) References Cited

U.S. PATENT DOCUMENTS

2003/0030003 A1* 2/2003 Maekawa et al. ........... 250/367

FOREIGN PATENT DOCUMENTS

| JP | 9-159769 A | 6/1997 |
|---|---|---|
| JP | 2000206254 A * | 7/2000 |
| JP | 2001-4757 A | 1/2001 |

\* cited by examiner

*Primary Examiner*—Constantine Hannaher
(74) *Attorney, Agent, or Firm*—Wenderoth, Lind & Ponack, L.L.P.

(57) ABSTRACT

An elongated, thinner apparatus is provided so as to measure surface contamination in narrow places and piping. An elongated plate-shaped radioactivity detection section (10) provided with a scintillator and a radioactivity measuring section (12) provided with a photomultiplier are provided as independent components and are connected together using a wavelength conversion optical fiber cable (14). A measurement signal (optical signal) of α-rays detected by the radioactivity detection section is transmitted to the radioactivity measuring section via the optical fiber cable. The radioactivity detection section is provided with elongated light guides, sets of wavelength conversion optical fibers, each set consisting of two optical fibers, arranged along the light guides in close contact therewith, a scintillator layer and a light-shielding film, and these components are surrounded by a light-shielding frame so that only a detection surface of the light-shielding film is exposed and the optical fibers extend from the radioactivity detection section as the optical fiber cable provided with a light-shielding outer covering.

2 Claims, 2 Drawing Sheets

α-rays

Radioactive material

RADIOACTIVITY MEASURING APPARATUS USING OPTICAL FIBER

FIELD OF THE INVENTION

The present invention relates to a portable type radioactivity measuring apparatus having a radioactivity detection section and a radioactivity measuring section separately. More specifically, the present invention relates to a radioactivity measuring apparatus using an optical fiber constructed of an elongated plate-shaped radioactivity detection section provided with a scintillator and a radioactivity measuring section provided with a photomultiplier, both of which are connected together via a wavelength conversion optical fiber cable so as to transmit a measurement signal (optical signal) of detected α-rays to the radioactivity measuring section using an optical fiber cable.

BACKGROUND OF THE INVENTION

Nuclear power related facilities, etc., produce many articles to be taken out and waste of various shapes. The former includes apparatuses, equipment, scaffolding, etc. which were used in a controlled area, and the latter includes waste produced when aging facilities are remodeled or dismantled. It is mandatory to classify these articles and waste according to their radioactivity levels so that they are subjected to predetermined processing such as disposal or storage. For this purpose, the presence/absence and the level of radioactive contamination of waste are measured using various radioactivity measuring apparatuses. In this case, a surface contamination survey meter is widely used to measure surface contamination by measuring the entire surface of an object to be measured.

A conventional survey meter is constructed of a probe incorporating a scintillator or gas type detector and a radioactivity measuring section provided with a calculation circuit for calculating measured values and a meter display section, etc., both of which are connected together via an electric signal cable (see, for example, Japanese Patent Laid-Open Specification No. 2001-4757).

Most of such conventional surface contamination surveymeters are of a type of meter which detects radioactive contamination of the surface of waste, but it is extremely difficult through measurements using such surveymeters to detect the presence/absence of contamination inside equipment or on the inner surface of piping, etc., and the contamination level thereof. This is because in most cases their probes are too big to be inserted inside the equipment or piping. For example, a scintillation detector needs to have a structure including a scintillator and photomultiplier, while a gas type detector (a proportional counter or a GM tube) is filled with a gas and needs to keep a certain distance between an anode electrode and a cathode electrode, and it is difficult to reduce the volume in both cases. Therefore, for objects that cannot be measured, it is necessary, for example, to cut the piping longitudinally for direct measurement, which results in considerably low efficiency in measurement work.

On the other hand, when an object to be measured is a human body, clothes or other object having two-dimensional extension, a radioactivity detection apparatus is being developed whose detection surface is expanded accordingly (see, for example, Japanese Patent Laid-Open Specification No. 9-159769/1997). The radioactivity detection section has a structure, for example, having a plate-shaped scintillator with an expanded detection surface so as to guide light generated by radiation into a photomultiplier through a wavelength conversion optical fiber, all of which are integrated as one body. Therefore, an electric signal photoelectrically converted by the photomultiplier of the radioactivity detection section is transmitted to the measuring section of the main body via an electric cable. When an object to be measured has, for example, a curved surface, such a structure must be designed according to the curved surface, which results in insufficient versatility. Furthermore, such a structure may be suitable when the object to be measured has a plate-shape and a large area, but it is difficult to narrow the shape, and such an apparatus is not suitable in a mode of use in which it is inserted inside equipment or piping.

SUMMARY OF THE INVENTION

The problems to be solved by the present invention include problems that a probe (detector) of a conventional structure is big so that it is difficult to insert the probe inside equipment or piping and it is not possible to perform direct measurements without longitudinal cutting of piping, etc., which results in very poor efficiency in measurement work.

According to the present invention, there is provided a radioactivity measuring apparatus using an optical fiber. The apparatus comprises an elongated plate-shaped radioactivity detection section provided with a scintillator; a radioactivity measuring section provided with a photomultiplier and arranged separately from the radioactivity detection section; and a wavelength conversion optical fiber cable connected between the radioactivity detection section and the radioactivity measuring section. A measurement signal (an optical signal) of α-rays detected by the radioactivity detection section is transmitted to the radioactivity measuring section via the optical fiber cable.

Here, the radioactivity detection section preferably comprises a plurality of elongated light guides; a plurality of sets of wavelength conversion optical fibers, each set consisting of two fibers, arranged along the light guide in close contact therewith, the optical fibers extending from the radioactivity detection section as the wavelength conversion optical fiber cable provided with a light-shielding outer covering; a scintillator layer located on the surface of the light guide; a light-shielding film disposed so as to cover the scintillator layer; and a light-shielding frame having an elongated frame structure and surrounding the light guides, the optical fibers, the scintillator layer and the light-shielding film so that only a detection surface of the light-shielding film is exposed.

For example, two wavelength conversion optical fibers each having a rectangular cross section are arranged in parallel in close contact with each other and the wavelength conversion optical fiber pairs are disposed with each pair sandwiched between the light guides made of silica glass, etc., so as to have an elongated plate-shape as a whole. A resin film coated with a ZnS(Ag) scintillator is placed on one side thereof. It is preferable to use an aluminum-coated resin film as the light-shielding film.

The radioactivity measuring apparatus using an optical fiber of the present invention need not incorporate a photomultiplier in the radioactivity detection section. Therefore, this allows the apparatus to become more elongated and thinner, making it possible to measure surface contamination in narrow places such as gaps of equipment, the back of the apparatus, corners of a wall or inside of piping and scaffolding pipes. Furthermore, measurements need not be accompanied by incidental work such as longitudinal cutting of piping, which improves measurement efficiency drastically.

DETAILED DESCRIPTION OF THE INVENTION

The radioactivity measuring apparatus using an optical fiber according to the present invention is constructed so as to combine an elongated plate-shaped radioactivity detection section provided with a scintillator and a radioactivity measuring section provided with a photomultiplier as independent components connected together via a wavelength conversion optical fiber cable, transmit a measurement signal (optical signal) of α-rays detected by the radioactivity detection section to the radioactivity measuring section via the optical fiber cable, and convert the measurement signal to an electric signal by the photomultiplier of the radioactivity measuring section. Thus, a major feature of the present invention is to have a structure using the wavelength conversion optical fiber cable to transmit signals between the radioactivity detection section and the radioactivity measuring section and transmitting signals in the form of light.

In the present invention, the bulky photomultiplier is incorporated not in the radioactivity detection section side but in the radioactivity measuring section side. This allows the shape of the radioactivity detection section to be relatively freely designed, realizing a more elongated, thinner apparatus (e.g., a thickness of 10 mm or less). This also allows measurements of narrow places such as gaps of equipment and facilitates measurements of contamination on the inner surface and outer surface of objects to be measured having a curved shape such as pipes and drums.

Figure 1:
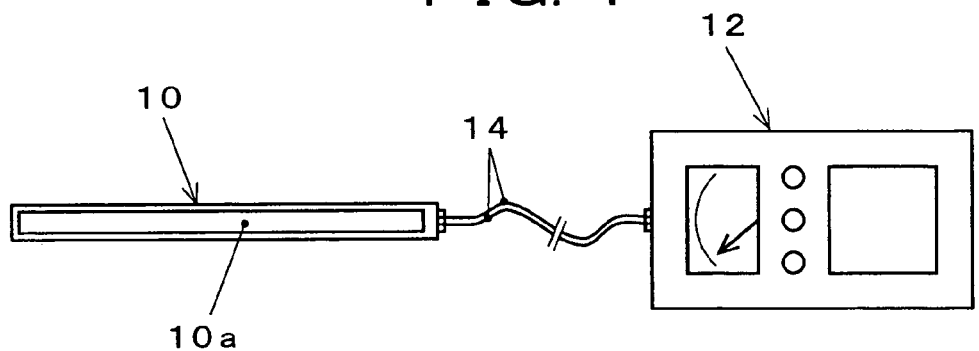
FIG. 1 is a conceptual diagram showing a radioactivity measuring apparatus according to the present invention.

FIG. 1 is a conceptual diagram showing the radioactivity measuring apparatus using an optical fiber according to the present invention. An elongated plate-shaped radioactivity detection section 10 provided with a scintillator and a radioactivity measuring section 12 provided with a photomultiplier are provided as separate components and these two sections are connected via a wavelength conversion optical fiber cable 14. A measurement signal (optical signal) of α-rays detected by the radioactivity detection section 10 is transmitted to the radioactivity measuring section 12 via the wavelength conversion optical fiber cable 14 and converted to an electric signal by the photomultiplier incorporated in the radioactivity measuring section 12. Reference numeral 10a denotes a detection surface.

Figure 2A:
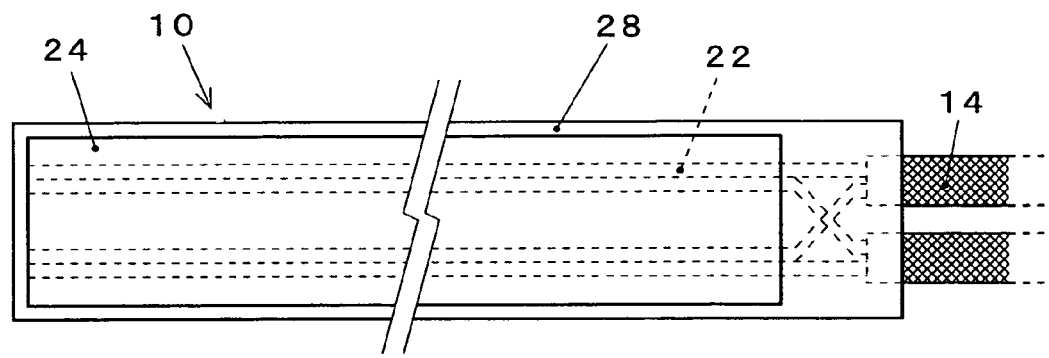
FIGS. 2A, 2B and 2C show details of an example of a radioactivity detection section.
Figure 2B:
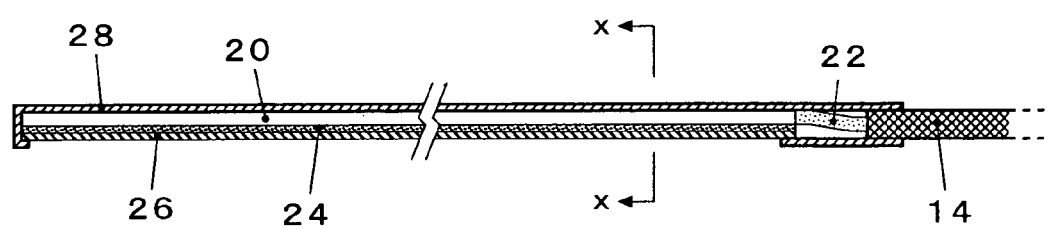
Figure 2C:
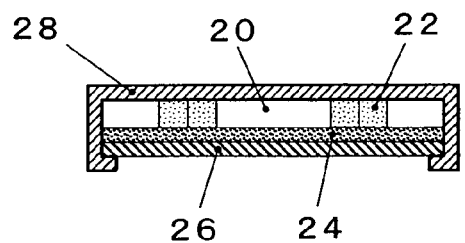
Figure 3:
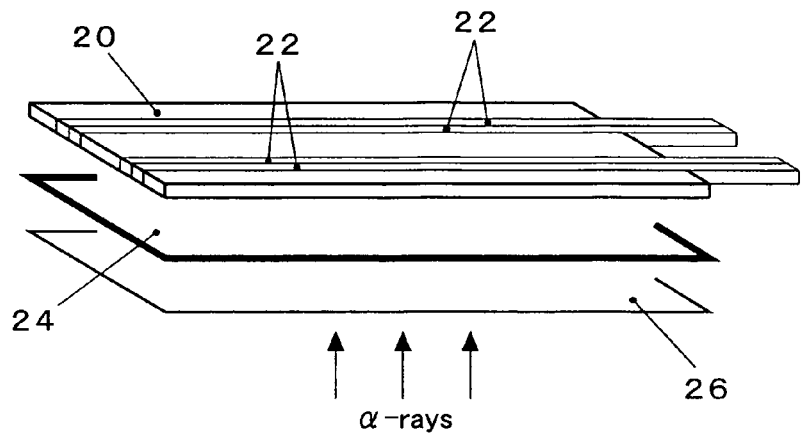
FIG. 3 is a schematic diagram of an internal structure of the radioactivity detection section.

An example of the radioactivity detection section is shown in FIGS. 2A, 2B and 2C. FIG. 2A is a view of the detection surface, FIG. 2B is a sectional view and FIG. 2C is an enlarged sectional view along a line x—x in FIG. 2B. The radioactivity detection section 10 comprises elongated light guides 20, two sets of wavelength conversion optical fibers 22, each set consisting of two fibers, arranged along the light guides 20 in close contact with the light guides, a scintillator layer 24 placed on the surface of the light guides 20 and a light-shielding film 26 disposed so as to cover the scintillator layer 24. The two wavelength conversion optical fibers 22 of the same set are arranged in close contact with each other. These components are surrounded by a metallic light-shielding frame 28 having an elongated frame structure so that only the front surface (detection surface) of the light-shielding film 26 is exposed. The wavelength conversion optical fibers 22 extend from the radioactivity detection section as the wavelength conversion optical fiber cable 14 provided with a light-shielding outer covering. The internal structure of the radioactivity detection section 10 is schematically illustrated in FIG. 3.

As shown in FIG. 2C, the wavelength conversion optical fiber 22 having a rectangular cross section is used in this example. Two wavelength conversion optical fibers 22 having a rectangular cross section (e.g., a cross section of approximately 1 mm×1 mm) are arranged in parallel in close contact with each other and two pairs of the wavelength conversion optical fibers are put apart from each other and these wavelength conversion optical fiber pairs are disposed with each pair sandwiched between the light guides 20 made of silica glass so as to have an elongated plate-shape as a whole. Therefore, three light guides 20 are used in this example and the thickness of the light guide 20 is set to 1 mm in conformity with the sectional dimension (thickness 1 mm) of the wavelength conversion optical fiber 22.

Then, a resin film having a ZnS(Ag) scintillator layer 24 is placed on one side of the elongated flat plate combining the light guides 20 and wavelength conversion optical fibers 22 arranged in the above-described manner. The resin film having a scintillator layer comprises a base of a polyester (trade name: Mylar) film, etc. and a coating layer coated on the surface of the base film with a mixture of a powdery ZnS (Ag) scintillator and an adhesive. As the light-shielding film 26, an aluminum-coated resin film comprising a polyester (trade name: Mylar) film, etc. onto the surface of which aluminum is evaporated is used.

Figure 4:
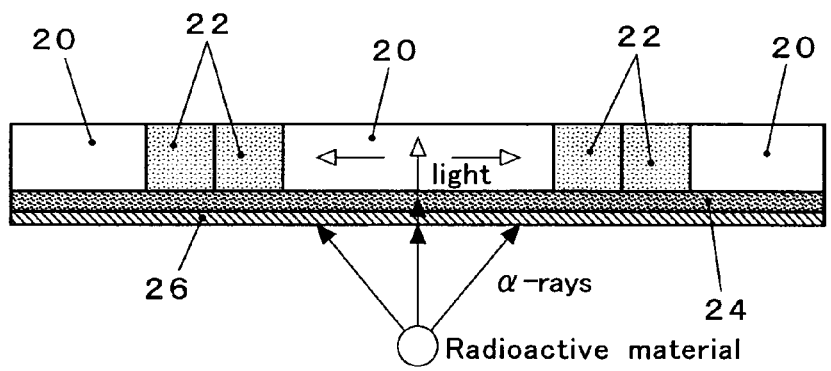
FIG. 4 illustrates an operation of the radioactivity detection section.

FIG. 4 illustrates an operation of the radioactivity detection section. Alpha-rays emitted from a radioactive material pass through the light-shielding film 26 and reach the ZnS (Ag) scintillator layer 24 and generates scintillation light. The scintillation light generated propagates directly or inside the light guides 20 to reach the wavelength conversion optical fibers 22, is converted to a wavelength appropriate for photoreception or transmission, propagates through the wavelength conversion optical fibers 22, passes through the wavelength conversion optical fiber cables 14 and reaches the photomultiplier of the radioactivity measuring section.

In the present invention, it is important that the generated scintillation light reaches the wavelength conversion optical fibers efficiently. For this purpose, by using the wavelength conversion optical fibers 22 having a rectangular cross section and adopting a structure sandwiching the optical fibers between the light guides 20 made of silica glass, it is possible for the light guides 20 to guide the scintillation light in the lateral direction (in-plane direction) and converge the light into the wavelength conversion optical fibers 22 efficiently. Furthermore, the use of one set of two wavelength conversion optical fibers 22 having a rectangular cross section arranged in close contact with each other allows the scintillation light to be always detected simultaneously by the two wavelength conversion optical fibers 22. The existence of cavities in the contact surface of these components reduces the light converging efficiency, and therefore optical grease is interposed between the contact surfaces of these components.

Figure 5:
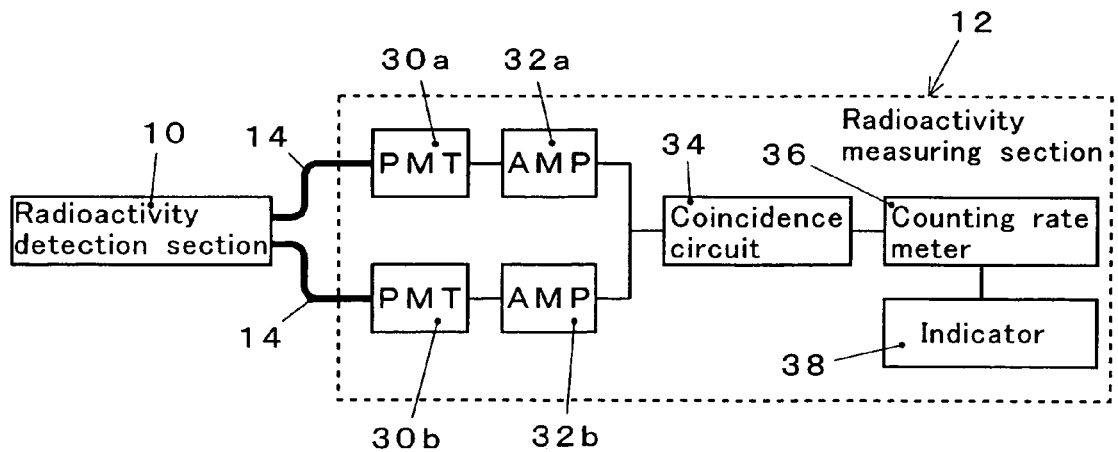
FIG. 5 is a block diagram of the radioactivity measuring apparatus.

FIG. 5 is a schematic block diagram of the radioactivity measuring apparatus. The circuit structure for measuring radiation may be the same as the conventional one. The radioactivity measuring section 12 is provided with a pair of photomultipliers (PMT) 30*a*, 30*b*, amplifiers (AMP) 32*a*, 32*b* connected to both of the photomultipliers 30*a*, 30*b*, respectively, a coincidence circuit 34 which generates an output signal only when the two outputs match, a counting rate meter 36 which outputs the signal converted to a DC voltage which is proportional to a counting rate (cpm) and an indicator 38, etc.

As described above, α-rays are converted to scintillation light by the radioactivity detection section 10, the respective output light signals of a set of two wavelength conversion optical fibers are transmitted to the respective photomultipliers 30*a*, 30*b* through the wavelength conversion optical fiber cables 14 as light signals and converted to electric signals by the photomultipliers 30*a*, 30*b*. The amplifiers 32*a*, 32*b* amplify micro voltage pulses from the photomultipliers 30*a*, 30*b* and perform waveform shaping so as to facilitate signal processing at the following circuits. At the following stage of the amplifiers, there is normally provided a pulse-height discriminator (not shown) which cuts electric noise irrelevant to the signals of incident radiation and converts only pulse signals having a peak value equal to or higher than a set voltage (discrimination voltage) to pulse signals having a predetermined shape (having a predetermined peak and width). The coincidence circuit 34 has the function of outputting one pulse signal having a predetermined shape only when two signal pulses are input simultaneously within a predetermined time. This function can reliably eliminate random pulse signals having no temporal correlation such as noise except in the case where signals temporally coincide with one another by accident. The counting rate meter 36 converts an input pulse signal to a DC voltage which is proportional to a counting rate (cpm) and outputs the DC voltage. The indicator (analog meter) 38 displays the output voltage of the counting rate meter 36 converted to the counting rate.

The above described embodiment shows the case where two sets of wavelength conversion optical fibers, each set consisting of two optical fibers, are provided in the radioactivity detection section, but it is needless to say that three or more sets of wavelength conversion optical fibers may be incorporated.

What is claimed is:

1. A radioactivity measuring apparatus using an optical fiber, said apparatus comprising:
    an elongated plate-shaped radioactivity detection section provided with a scintillator;
    a radioactivity measuring section provided with a photomultiplier and arranged separately from said radioactivity detection section; and
    a wavelength conversion optical fiber cable connected between said radioactivity detection section and said radioactivity measuring section,
    wherein a measurement signal of α-rays detected by said radioactivity detection section is transmitted to said radioactivity measuring section via said optical fiber cable,
    wherein said radioactivity detection section comprises
    a plurality of elongated light guides;
    a plurality of sets of wavelength conversion optical fibers, each set consisting of two fibers, arranged along said light guides in close contact therewith, said optical fibers extending from said radioactivity detection section as the wavelength conversion optical fiber cable provided with a light-shielding outer covering;
    a scintillator layer located on the surface of said light guide;
    a light-shielding film disposed so as to cover said scintillator layer; and
    a light-shielding frame having an elongated frame structure and surrounding said light guides, said optical fibers, said scintillator layer and said light-shielding film so that only a detection surface of said light-shielding film is exposed.

2. The radioactivity measuring apparatus according to claim 1, wherein two wavelength conversion optical fibers each having a rectangular cross section are arranged in parallel in close contact with each other and the wavelength conversion optical fiber pairs are disposed with each pair sandwiched between said light guides so as to have an elongated plate-shape as a whole, a resin film coated with a ZnS(Ag) scintillator is placed on one side thereof and an aluminum-coated resin film is used as said light-shielding film.

\* \* \* \* \*